UNITED STATES PATENT OFFICE.

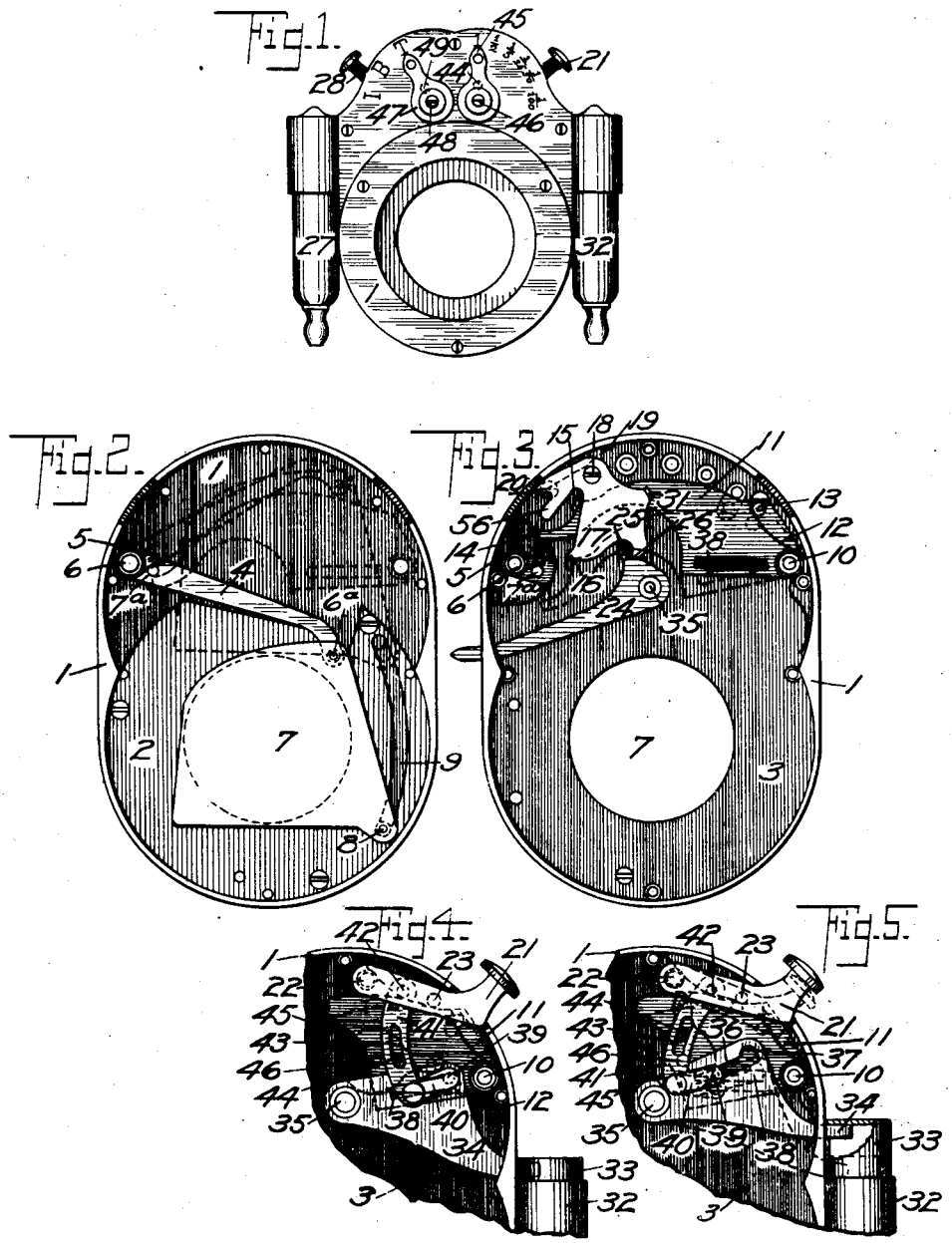

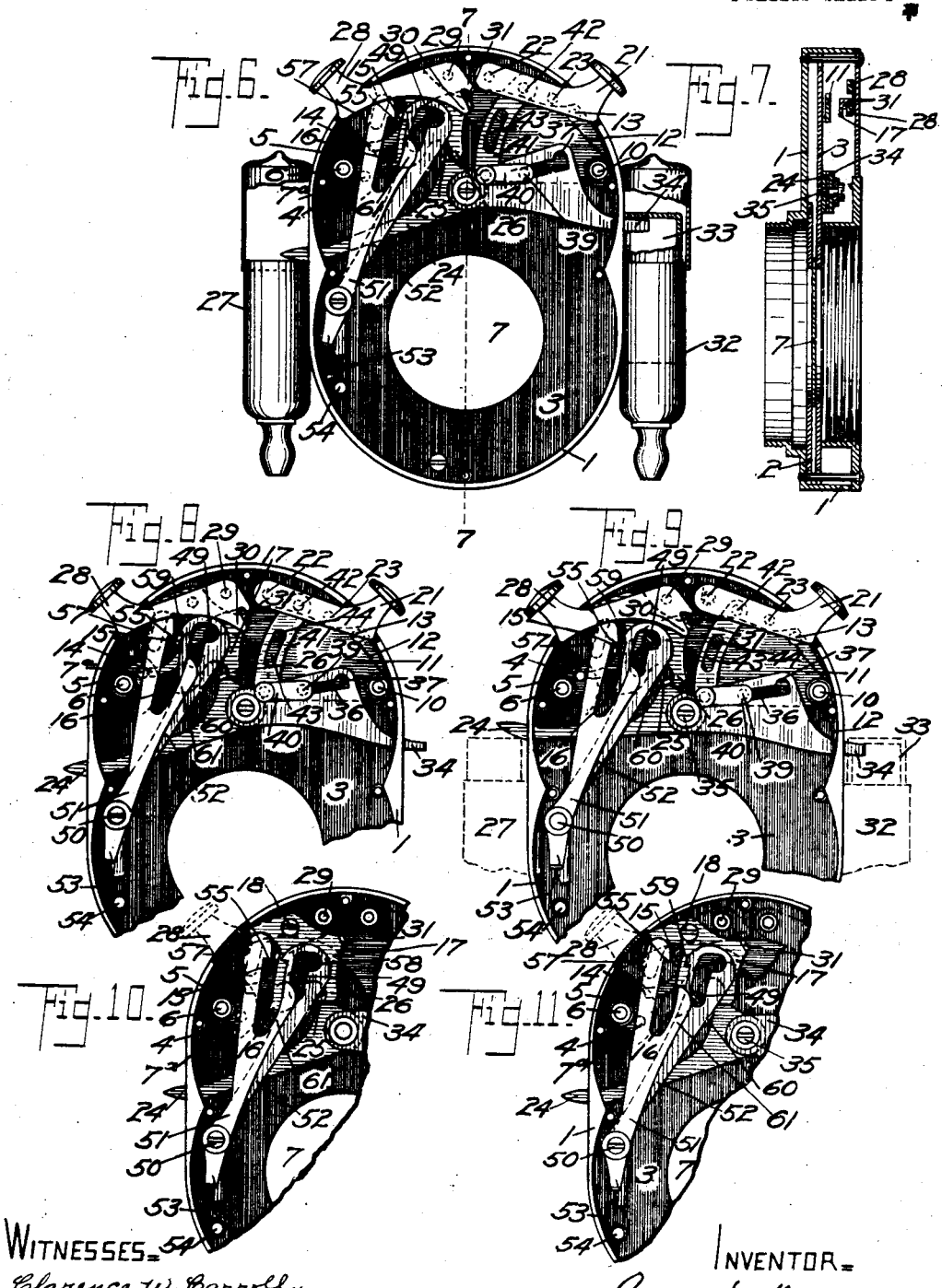

ANDREW WOLLENSAK, OF ROCHESTER, NEW YORK, ASSIGNOR TO WOLLENSAK OPTICAL COMPANY, OF ROCHESTER, NEW YORK, A CORPORATION OF NEW YORK.

PHOTOGRAPHIC SHUTTER.

No. 831,202.     Specification of Letters Patent.     Patented Sept. 18, 1906.

Application filed March 2, 1904. Serial No. 196,151.

*To all whom it may concern:*

Be it known that I, ANDREW WOLLENSAK, a citizen of the United States, and a resident of Rochester, in the county of Monroe and State of New York, have invented certain new and useful Improvements in Photographic Shutters, of which the following is a specification.

This invention relates to photographic shutters, and particularly to shutters adapted to make automatic exposures of different lengths—bulb exposures and time exposures.

In the drawings, Figure 1 is a front elevation of a device embodying this invention. Fig. 2 is a front elevation of the shutter, parts being removed to show the shutter-arm and the means for guiding the shutter in its path. Fig. 3 is a plan view of a portion of the shutter mechanism, the detents, the retarding, the setting, and the operating mechanisms being removed. Fig. 4 is a view of parts of the device, showing the same set for automatic exposures of the highest speed. Fig. 5 is a view of the same parts, showing them set for automatically-timed exposures of the slowest speed. Fig. 6 is a view of the mechanism after an automatically-timed exposure. Fig. 7 is a vertical section on the line 7 7 of Fig. 6. Fig. 8 is a view of the mechanism set for a time exposure and while the shutter is held open. Fig. 9 is a view of the same parts set for a time exposure after the pump-lever has been raised to open the shutter and just before engagement of the detent that holds the shutter open during the time exposure. Fig. 10 is a view of the same parts set for a bulb exposure after the bulb is released and the shutter has closed, and Fig. 11 is a view of the parts set for an automatically-timed exposure after the exposure has been made.

The apparatus is contained in a case 1, having within it two plates 2 and 3, perforated, as shown in each of the figures, for the passage of light. To the casing 1 and behind the partition 3 is pivoted the shutter-lever 4, having a spring 5 around its pivot 6 and pressing against the pin 7ª for actuating the arm to close the shutter from the position shown in dotted lines in Fig. 2 to the position shown in full lines in said figure. The shutter-lever 4 is pivoted at 6ª to the shutter 7, and the shutter has a pin 8, situated at some distance from the pivot 6 and which runs in a guide 9 in the partition 2. The shutter moves upward and downward.

On the front side of the plate 3 is pivoted at 10 the spring-operated master-lever 11, having an actuating-spring 12, which is stronger than the spring 5. This spring or motor in the present instance is coiled around the pivot 10, has an end pressing against the case 1, and an end pressing against a pin or projection 13 upon the master-lever. On the opposite side of the case the end 14 of the master-lever is beveled, and the top of the pin 7ª is also beveled so as to permit said end to pass over the pin when moving downward to the dotted-line position of Fig. 3, thus compressing the spring 12 of the master-lever. If now the master-lever is released, it will move from the position shown in dotted lines in Fig. 3 to the position shown in full lines in said figure, pushing before it the pin 7ª, and thus opening the shutter, which takes the position shown in dotted lines in Fig. 2 until the end 14 passes the pin 7ª, whereupon the spring 5 of the operating-lever 4 immediately carries the shutter 7 back to the position shown in full lines in Fig. 2, closing it.

The master-lever 11 has a projection 15, which is adapted to engage the point 16 of the releaser 17. The releaser is a plate pivoted to the case at 18 and actuated in a clockwise direction by a spring 19, coiled about the pin or pivot 18 and projecting against a portion, such as the projection 20 of the releaser 17. The releaser is normally stopped against the case. As the master-lever 11 descends its projection 15 presses against the upper side of the point 16 of the releaser and passes the point, whereupon the spring 19 carries the releaser back so that said point 16 is over the projection 15 on the master-lever and detains the master-lever in this set position. The master-lever is set by a setting-lever 21, projecting out through the case and pivoted thereto at 22 and having a pin 23 projecting inward over the upper edge of the master-lever. A spring returns the setting-lever to its upper position independently of the master-lever. When the setting-lever 21 is pressed downward, the pin 23 forces the master-lever from the position shown in full lines in Fig. 3 to that shown in dotted lines in said figure. In order to release the master-lever from the position shown, two mechanisms are provided, one of which is the pump-lever 24, having a projection 25 on one end which engages a projection 26 on the releaser 17, while the other end is operated by the pump 27 to tilt the pump-lever and the releaser, and thus to release the master-lever. A thumb operating or releasing lever 28 is pivoted to the case at 29 and has a portion or projection 30 adapted to make contact with a portion or projection 31 on the releaser 17, so that when the thumb-lever 28 is depressed the releaser 17 will be moved contrary to clockwise, and the point 16 of the releaser will be withdrawn, so that said master-lever may rise, open the shutter, and release said shutter, which thereupon closes under the action of the spring 5.

In order to restrain or retard the action of the motor-spring 12, a retarder is employed for retarding the motor in various degrees, and thus to produce graded exposures of different lengths. This mechanism consists in the brake or retarder consisting of a dash-pot, in this case consisting of a body 32 and a plunger 33, fitting said body loosely, but when raised adapted to draw air into the empty space formed by such raising. It is obvious that as the plunger 33 rises the area of the space between the plunger and the body for the passage of air into the interior is gradually decreased, thereby decreasing the resistance to the passage of air inward into the body, and that as said plunger rises the speed of the shutter will increase under the constant action of the spring 12. This arrangement constitutes an automatically-changing air-passage for progressively reducing the resistance of the dash-pot to movement as the plunger moves relatively outward with reference to the cylinder. Connected to said plunger 53 is a retarder-lever 34, pivoted to the case at 35 and having in it a slot 36, which has at one end the enlargement 37. The master-lever lies under the retarder-lever 34 and has also a slot 38. A pin 39 passes through both slots 36 and 38 and is carried by a link 40, pivoted to an arm 41, which itself is pivoted at 42 to the case. The arm 41 has a slot 43, in which rests a pin 44, attached to an indicator 45, pivoted at 46 to the front of the case.

It will be seen by comparing Fig. 1 that as the indicator 45 is turned the pin 39 will be forced in one direction or the other along the two slots 36 and 38, and when the pointer of said indicator points to the smallest numeral on the outside of the case the pin will be nearest to the pivot 10 of the master-lever and farthest from the pivot 35 of the retarding-lever 34. Consequently the spring 12 will have greater force, and the plunger 33 will not have been moved from its lowest position. When the pin 39 lies in the enlargement 37 of the slot 36, the movement of the pin caused by its connection with the slot 38 in the master-lever will not cause any movement of the retarder-lever 34 when the shutter is actuated. As the pin 39 is moved to the left in the slots by turning the indicator 45 contrary to clockwise it moves farther away from the spring 12 and nearer to the pivot 35 of the retarding-lever 34 and, as shown in Figs. 4 and 5, raises or lowers the plunger 33, so as to prepare it for a shorter or longer stroke. As the pin 39 is moved toward the left the plunger is raised and its stroke increased. In consequence of this there will be also more resistance to the action of the motor-spring 12, which will cause slower movement of the shutter in proportion to the yielding resistance to the action of the spring 12, produced by the dash-pot. It will be noticed that the shutter 7 moves substantially vertically and uncovers the exposure-opening from the bottom upward, and in view of the fact that the retarding-lever 34 will decrease in effect and move faster as the plunger 33 moves upward the lower portion of the exposure-opening is uncovered slowly, and the movement of the shutter increases as the shutter rises. Consequently there will be a slower and longer exposure for the foreground of the picture and a quicker and shorter exposure for the sky. This is desirable because of the stronger light of the sky. The return movement of the shutter occurs by the free action of the spring 5, and therefore is of uniform velocity.

On the outside of the case and in proper relation to the timing-indicator 45 are a series of figures indicating the times of the automatically-timed exposures, being in the present case varied from one second to one one-hundredth of a second. On the outside of the case is another indicator 47, pivoted to the case at 48 and having an eccentric-pin 49 extending into the interior. Relatively to said indicator are three letters "I," "B," and "T," referring, respectively, to the different kinds of exposures—instantaneous, bulb, and time. Within the case there are pivoted at 50 two spring-actuated detents or steps 51 and 52. A single spring 53, in the present case coiled about the pin 54, is used for independently pressing the lower ends of said controllers in opposite directions, moving the upper end of the detent 52 toward the left and the upper end of the detent 51 toward the right. The bulb-detent 51 has at its upper end a projection or stop 55, which when it is free extends into the path of the projection 15 on the master-lever 11. When the pump 27 or the thumb-lever 28 is operated, the projection 15 is released from the point 16 of the releaser 17 and the master-lever engages the shutter-operating lever 4 and opens the shutter until the projection 15 is caught by the stop 55 on the detent 51 and the end 14 of the master-lever presses against the pin 7ª and holds the shutter open. On the releaser 17 is an arm 56, (see Fig. 3,) which engages a projection 57 on the detent 51, so that the spring 19, acting through the arm 56 upon the projection 57, tends to move the detent 51 toward the left and out of the path of the projection 15. The movement of the arm 24 or of the lever 28 tilts the releaser 17 and moves the arm 56 toward the right, whereupon the spring 53 tilts the upper end of detent 51 toward the right, and as long as this position of the parts is maintained by continued pressure upon the thumb-piece 28 or by maintained pressure in the pump the shutter is held open; but as soon as the lever is released or the pump-pressure is removed the projection 15 is released from the stop 55 by the pressure of the arm 56 against the projection 57, so that the master-lever may continue its upward movement, releasing the shutter-arm and permitting the shutter to close. For this position it is necessary that the indicator 47 should point to the letter "B," in which case the pin 49 rests in a slot 58 in the detent 52, as shown in Fig. 10, and holds the detent 52 out of operation, permitting the detent 51 to act alone.

The time-detent 52 is employed for time exposures and has a stop 59 at its upper end adapted to be set in the path of the projection 15 of the master-lever, and this detent has an L-shaped slot in it for the pin 49. If the pin is in the lower vertical part of said slot, it holds the detent 52 out of operation; but if it is in the upper transverse portion of the slot the detent 52 is free to act. For time exposures only the pin 49 is in the upper part of the slot, and the action of the device is as follows: The master-lever is set as usual, so that its projection 15 is caught under the point 16 of the releaser 17. Then the releaser is turned, releasing the projection 15, which thereupon rises and is caught by the stop 55 on the detent 51. On releasing the lever 28 or the pump 27 the detent 51 may move toward the left, pushed by the arm 56, and thereupon the projection 15 slips off the stop 55 and under the stop 59 on the detent 52. If the lever is operated rapidly, the projection 15 is caught directly by the stop 59. On again operating the pump or the lever 28 the releaser 17 is moved toward the left, and a portion of said lever presses against a projection 60 on the detent 52, moving it toward the left and releasing the projection 15 of the master-lever from the stop 59 on the other detent.

For instantaneous exposures the indicator 47 is pointed to "I," whereby the pin 49 is brought into the lowest part of the slot 58, thus holding the detent 52 out of operation, and also presses against the end of a beveled arm 61 on the detent 51, which presses this detent out of operation, and thus leaves the projection 15 free to move upward without restraint from the detents, but retarded by the dash-pot, according to the setting of the indicator 45.

What I claim is—

1. In a photographic-shutter device, a case, a single sliding shutter, a shutter-lever pivoted to the case and to said shutter and having a beveled portion, a spring for actuating said shutter-lever, a master-lever having a laterally-movable beveled portion adapted to coact with the beveled portion of said shutter-lever, means in the case for guiding said shutter, and means for operating the master-lever.

2. In a photographic-shutter device, a case having a guide-slot, a single sliding shutter having a projection running in said slot, a shutter-lever pivoted to the case and to the shutter and having a beveled portion, a spring for actuating said shutter-lever, a master-lever having a laterally-movable beveled portion adapted to coöperate with the beveled portion of the shutter-lever, and means for operating the master-lever.

3. In a photographic-shutter device, a case having a guide-slot 9, a single sliding shutter 7 having the pin 8 running in said slot, the shutter-lever 4 pivoted to the case and to the shutter 7 and having the beveled pin 7$^a$, the spring 5 for actuating said shutter-lever, the master-lever 11 having the beveled spring end 14 adapted to coöperate with the beveled pin 7$^a$, and means for operating the master-lever.

4. In a photographic-shutter device, a case, a single sliding shutter, a shutter-lever pivoted to the case and to said shutter and having a beveled portion, a spring for actuating said shutter-lever, a master-lever having a laterally-movable beveled portion adapted to coact with the beveled portion of said shutter-lever, means in the case for guiding said shutter, a setting device for the master-lever, and a releasing device therefor.

5. In a photographic-shutter device, a case having a guide-slot, a single sliding shutter having a projection running in said slot, a shutter-lever pivoted to the case and to the shutter and having a beveled portion, a spring for actuating said shutter-lever, a master-lever having a laterally-movable beveled portion adapted to coöperate with the beveled portion of the shutter-lever, a setting device for the master-lever, and a releasing device therefor.

6. In a photographic-shutter device, a case having a guide-slot 9, a single sliding shutter 7 having the pin 8 running in said slot, the shutter-lever 4 pivoted to the case and to the shutter 7 and having the beveled pin 7$^a$, the spring 5 for actuating said shutter-lever, the master-lever 11 having the beveled spring end 14 adapted to coöperate with the beveled pin 7$^a$, a setting device for the master-lever, and a releasing device therefor.

7. In a photographic-shutter device, a case, a single sliding shutter, a shutter-lever pivoted to the case and to said shutter and having a beveled portion, a spring for actuating said shutter-lever, a master-lever having a laterally-movable beveled portion adapted to coact with the beveled portion of said shutter-lever, means in the case for guiding said shutter, means for setting the master-lever, a catch for holding it, and means for releasing the catch.

8. In a photographic-shutter device, a case having a guide-slot, a single sliding shutter having a projection running in said slot, a shutter-lever pivoted to the case and to the shutter and having a beveled portion, a spring for actuating said shutter-lever, a master-lever having a laterally-movable beveled portion adapted to coöperate with the beveled portion of the shutter-lever, means for setting the master-lever, a catch for holding it, and means for releasing the catch.

9. In a photographic-shutter device, a case having a guide-slot 9, a single sliding shutter 7 having the pin 8 running in said slot, the shutter-lever 4 pivoted to the case and to the shutter 7 and having the beveled pin 7ª, the spring 5 for actuating said shutter-lever, the master-lever 11 having the beveled spring end 14 adapted to coöperate with the beveled pin 7ª, means for setting the master-lever, a catch for holding it, and means for releasing the catch.

10. In a photographic-shutter device, a shutter, a master member, a time-detent and a bulb-detent, independently movable, for the master member, a releaser for operating the master member and the time-detent successively when the releaser is moved in one direction and for operating the bulb-detent when the releaser is moved in the other direction.

11. In a photographic-shutter device, a shutter, a master member, two independently-movable detents for the master member, a releaser for the master member and for each detent, and an indicator device adapted to engage each detent and to move one or both out of operation.

12. In a photographic-shutter device, a shutter, a master member, two independently-movable detents for the master member one detent having a slot and the other detent having an arm, a releaser for the master member and for each detent, and an indicator device having a part adapted to move one detent out of operation by engaging the slot and the other by pressure against said arm.

13. In a photographic-shutter device, a shutter, a master member, two detents for the master member, and a releaser having an arm to engage and release the master member and an arm to engage and release one detent and an arm to engage and release the other detent.

14. In a photographic-shutter device, a shutter, a master member for causing the opening and closing of the shutter, a releaser therefor, a retarder therefor, an indicator device for controlling the retarder, detent mechanism for the master member, and an indicator device for controlling the detent mechanism.

15. In a photographic-shutter device, a shutter, a master member for causing the opening and closing of the shutter, a retarder, an indicator device for controlling the retarder, two detents for the master member, an indicator device for controlling one or both detents, and a releaser adapted to engage and to release the master member and both detents.

16. In a photographic-shutter device, a single shutter, means for causing the shutter to open, and a retarder coöperating with said means and adapted to decrease in effect while the shutter is opening, whereby the shutter increases in speed as it opens.

17. In a photographic-shutter device, a shutter, means for causing the shutter to open and shut, a retarder coöperating with said means and adapted to decrease in effect while the shutter is opening, and means for varying the length of action of said retarder.

18. In a photographic-shutter device, a shutter, means for causing the shutter to open and shut, a dash-pot retarder coöperating with said means and adapted to decrease in effect while the shutter is opening, whereby the shutter increases in speed as it opens.

19. In a photographic-shutter device, a shutter, means for causing the shutter to open and shut, and a dash-pot retarder coöperating with said means and adapted to decrease in effect while the shutter is opening, and means for varying the length of movement of the dash-pot.

20. In a photographic-shutter device, a shutter, means for causing the shutter to open and shut, and a retarder consisting of a cylinder, a plunger in said cylinder and an automatically-changing air-passage between the plunger and the cylinder for progressively reducing the resistance of the dash-pot to movement as the plunger moves relatively outward from the cylinder to open the shutter.

21. In a photographic-shutter device, a shutter, means for causing the shutter to open and shut, a retarder consisting of a cylinder, a plunger in said cylinder and an automatically-changing air-passage between the plunger and the cylinder for progressively reducing the resistance of the dash-pot to movement as the plunger moves relatively outward from the cylinder to open the shutter, and means for varying the length of the relative movement of the cylinder and plunger.

22. In a photographic-shutter device, means for causing the shutter to open and shut, and a retarder consisting of a cylinder, a plunger fitting loosely in said cylinder and adapted to project therefrom and connections for moving the plunger relatively outward with reference to the cylinder and relatively to said means for opening the shutter, whereby the shutter increases in speed as it opens.

23. In a photographic-shutter device, means for causing the shutter to open and shut, a retarder consisting of a cylinder, a plunger fitting loosely in said cylinder and adapted to project therefrom and connections for moving the plunger relatively outward with reference to the cylinder and relatively to said means for opening the shutter, whereby the shutter increases in speed as it opens, and means for varying the length of stroke of the plunger.

24. In a photographic-shutter device, a shutter, operating means for actuating the shutter, a retarder-lever connected with said means, and a retarder adapted to decrease in effect as the shutter opens, and an adjustable connection between said retarder-lever and said operating means.

25. In a photographic-shutter device, a single sliding shutter, operating means for actuating the shutter comprising a pivoted master-lever having a radial slot, a pivoted retarder-lever having a radial slot, a retarder connected with said lever and adapted to decrease in effect as the shutter opens, a pivoted arm, a lever pivoted to said arm and a pin running in said two slots, and an indicator device for moving said arm to change the position of the pin in said slots.

26. In a photographic-shutter device, a casing, a shutter, a spring for closing it, a master member, a time-detent and a bulb-detent for said master member, a spring-operated releaser having three arms, one to engage the master-lever, one to engage the time-detent, and one to engage the bulb-detent, a lever extending through the casing for setting the master member, and a lever extending through the casing for actuating the releaser.

ANDREW WOLLENSAK.

Witnesses:
  CLARENCE W. CARROLL,
  D. GURNEE.